June 9, 1964  P. S. ECKHOFF  3,136,105
APPARATUS FOR PACKING METAL CONTAINERS IN CASES
Filed March 6, 1963  2 Sheets-Sheet 1

INVENTOR.
Paul S. Eckhoff
BY
James A. Eisenman
ATTORNEY

June 9, 1964 P. S. ECKHOFF 3,136,105
APPARATUS FOR PACKING METAL CONTAINERS IN CASES
Filed March 6, 1963 2 Sheets-Sheet 2

INVENTOR.
Paul S. Eckhoff
BY
James G. Eisenman
ATTORNEY

United States Patent Office 3,136,105
Patented June 9, 1964

3,136,105
APPARATUS FOR PACKING METAL
CONTAINERS IN CASES
Paul S. Eckhoff, Syosset, N.Y., assignor to Sheppard
Machinery, Inc., Oyster Bay, N.Y., a corporation of
New York
Filed Mar. 6, 1963, Ser. No. 263,294
8 Claims. (Cl. 53—247)

This invention relates to apparatus for orienting and packaging metal containers, including paint cans or the like.

In the automatic processing and packaging of metal cans such, for example, as one-gallon paint cans it is often necessary to orient the cans on a conveyer in a particular manner. Typically, one-gallon paint cans must be oriented so that the lugs or ears to which the wire handles or bails are fixed are disposed in a predetermined angular position. The cans cannot, for example, be snugly fitted within cartons without orienting the ears to fit in the void spaces at the rectangular corners of the cartons. The need for such orientation is particularly critical in the case of so-called side-loaded cartons which are not only less expensive to the packer but lend themselves to automated can packaging techniques.

Accordingly, it is one object of the present invention to provide new and improved apparatus for loading circular metal cans into side-loading cartons from moving conveyers.

Another object of the invention is to provide apparatus for establishing and maintaining the angular position or orientation of a series of metal cans on a conveyer.

Still another object of the invention is to provide apparatus for disposing a stream of conveyer-borne circular metal cans, having handle or bail-supporting ears on their sides, in predetermined angular positions on the conveyer preparatory to loading in side-loading cartons.

In accordance with the present invention there is provided an apparatus for orienting and packaging circular metal containers comprising a movable conveyer for receiving a stream of cans, a fixed stop for arresting the forward movement of the line of cans and for restraining them against the continuing motion of the conveyer, and a second stop selectively movable into the path of movement of the cans upstream of the fixed stop. The movable stop is preferably moved together with a pusher mechanism which progresses laterally across the conveyer to push a predetermined number of cans into a receiving area, which can take the form, for example, of a side-loading carton. While it is a relatively simple matter to restrain lateral movement of the cans on the conveyer at points upstream of the carton-loading area, such lateral control does not exist where the cans are free to be moved laterally from the conveyer, in this case in the vicinity of the fixed stop. Because the conveyer is continuously moving and because frictional force is generated by the conveyer on each can disposed thereon, the cumulative forces act to press the cans against one another and there is a tendency for an occasional can to be squeezed out of alignment by the "camming" action of adjacent cans. In accordance with the present invention this unauthorized lateral movement can be prevented by means of magnetic forces applied laterally against the sides of the cans, which magnetic forces are overcome by the pusher mechanism which forces the cans laterally from the conveyer. Also, in accordance with the present invention, the cans are aligned on the conveyer with their handle-mounting lugs or ears disposed at angles to the direction of travel of the conveyer, and also at angles to the direction of discharge motion from the conveyer, by means of a fixed turning or aligning arm interposed in the path of travel so that a moving can, if its ear is projecting laterally, will be engaged and the can rotated on its axis by virtue of the forward travel of the conveyer. The rotary motion of the container about its vertical axis on the moving conveyer is facilitated and enhanced by means of magnetic forces applied to the side of the metal can closely adjacent the point of rotation. In this fashion the can is held against the fixed aligning arm and also in its line of conveyer travel while it rotates, thereby presenting all containers downstream thereof in a position of appropriate angular orientation.

The above and other features of the invention will be apparent from the following specification, having reference to the accompanying drawings in which.

Figure 1:
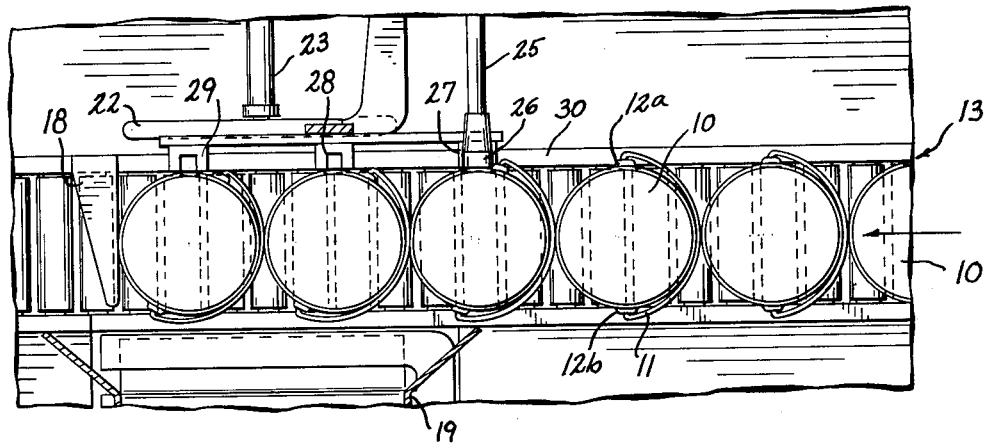
FIGURE 1 is a top view of metal can orienting and packaging apparatus formed in accordance with the present invention.

Referring to the drawings, the invention is illustrated as embodied in apparatus for orienting and packaging metal cans, the cans being identified by the numeral 10 and being, in the illustrated example, of the type having a wire handle or bail 11 attached to the can by means of laterally projecting ears or lugs 12a and 12b. The cans 10 approach the orienting and packaging mechanism on a conveyer indicated generally by the numeral 13, comprising a series of identical rollers 14, supported in the frame 15, for rotation about fixed axes. The rollers are driven in rotary motion at identical speeds by suitable drive means such, for example, as an endless friction belt 16, frictionally engaging the underside of the rollers and driven from a suitable pulley means 17.

The rollers 14 are preferably formed of material having relatively low friction characteristics working against the under sides of the metal cans 10, so that the aligned row of cans are moved down the length of the conveyer against a fixed stop 18, which holds the row of cans against the driving force of the continuously moving conveyer, one can pushing against the other. The cans move into the orienting and loading zones with their ears 12a projecting laterally or transversely of the direction of travel on the conveyer. The ears are disposed in this orientation as a result of a previous operation during which the labels and bails 11 are applied to the cans, these operations forming no part of the present invention.

Figure 2:
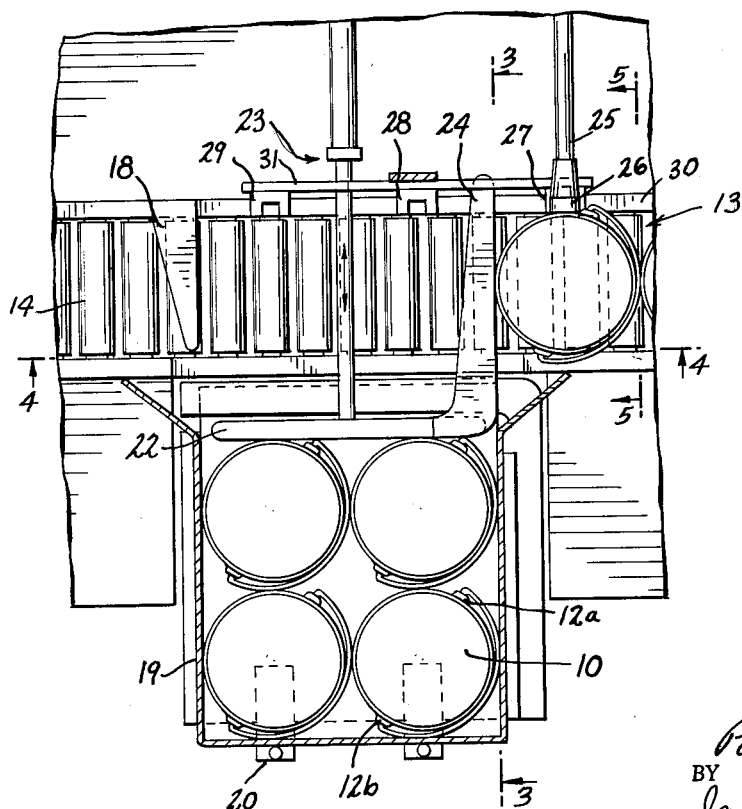
FIGURE 2 is a top view of the apparatus of FIGURE 1, illustrating a loading stage in the cycle of operation.
Figure 5:
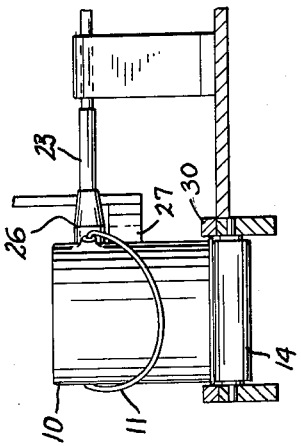
FIGURE 5 is a view in transverse section taken on the line 5—5 of FIGURE 2, looking in the direction of the arrows.
Figure 3:
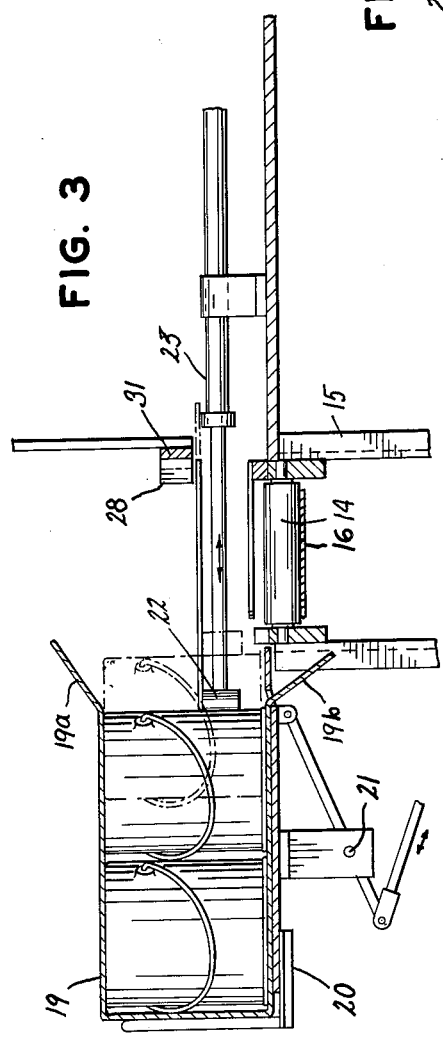
FIGURE 3 is a view in transverse section taken on the line 3—3 of FIGURE 2, looking in the direction of the arrows.
Figure 4:
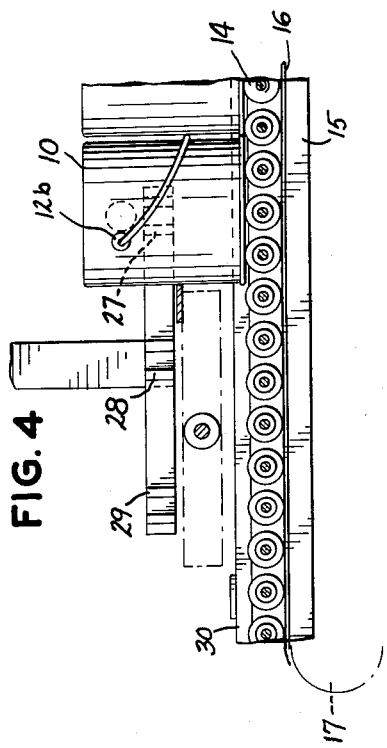
FIGURE 4 is a view in longitudinal section taken on the line 4—4 of FIGURE 2, looking in the direction of the arrows.

The illustrated apparatus is designed to effect side loading of cartons, one of which is illustrated in the drawings and identified by the numeral 19. The side-opening carton 19 is adapted to hold 4 cans, as best seen in FIGURE 2, and the size of the carton is such that the 4 cans fit snugly therein, assuming the ears 12a and 12b of each can are oriented so that they fall into the void spaces between the cans and between the cans and the rectangular side walls of the container 19. The container 19 is supported on a tilt frame indicated generally by the numeral 20 (FIGURE 3), which is arranged to swing counterclockwise about the pivot 21, to erect the side-loaded carton so that the flaps 19a and 19b thereof can be sealed by conventional sealing apparatus also forming no part of the present invention.

The cans are pushed in pairs from the conveyor 13 into the cartons 19 by means of a pusher bar 22 driven by an actuator 23 such, for example, as an air cylinder. As the pusher bar 22 engages a pair of cans 10 and slides them laterally from the conveyor 13 into the carton 19, the remaining cans in the line are held in place by an arresting bar 24 which moves with the pusher bar 22, and in the illustrated embodiment of the invention is formed integrally therewith. When the pusher bar 22 is retracted the arresting bar 24 releases the upstream line of cans 10 which then move as one for a distance of 2 can-lengths, to engage the fixed stop 18.

As the cans 10 move down the conveyor intermittently under the continuous driving force of the conveyor 13, the laterally projecting ears 12a of successive cans engage a fixed can-aligning arm 25 having a resilient tip portion 26 which is precisely positioned to be engaged by the ears to the extent they project laterally but not to engage the cylindrical wall of the can. The forward travel of the can with its ear 12a in engagement with the fixed, aligning arm 25 causes the can to rotate about its vertical axis by an amount sufficient to carry the ear out of the vertical plane which is tangent to the edges of the successive cans on the conveyor. As the cans are rotated about their vertical axes by the fixed aligning arm 25, there is a tendency for the cans under the dynamic effects of the rotary and translational movement on the conveyor to shift laterally. This motion, which is detrimental to the functioning of the apparatus, is prevented by applying a lateral force to the can being rotated in the direction of the aligning arm 25, the force being imparted in a preferred arrangement of the invention by means of a permanent magnet 27 disposed closely adjacent the aligning arm 25. In this fashion each can is held closely against the tip 26 of the aligning arm as it rotates thereabout in its travel toward the fixed stop 18. The impact of the line of cans 10 against the fixed stop 18, coupled with the continuing frictional force of the conveyor rollers 14, tends to buckle the line of cans out of their true alignment. These forces are at a maximum in the vicinity of the loading area due to the pressure from the cans upstream and once a can is displaced out of precise alignment, the camming action deriving from the abutted cylindrical surface of adjacent cans tends to impart increased forces to the displaced can, thereby further disturbing the alignment. To maintain the precise alignment and orientation in the vicinity of the loading area without preventing the desired lateral displacement imparted by the pusher bar 22, a pair of permanent magnets 28 and 29 are mounted adjacent the edges of the two cans nearest the stop 18 to hold the cans against an aligning rail 30. Thus the magnets 28 and 29 perform a different function from the magnet 27, although for convenience each of the 3 magnets 27, 28 and 29 are carried on a fixed mounting bar 31 secured to the frame of the machine. It will be understood that the force imparted by the magnet 27 is easily overcome by the forward motion of the cans on the conveyor and that the holding forces of the magnets 28 and 29 are readily overcome by the positive action of the pusher bar 22 as it engages a pair of cans and slides them laterally off the conveyor rollers and into the waiting carton 19. It will be understood that the magnets 28 and 29, in addition to holding the cans in precise alignment, prevent the cans from rotating on their axes by virtue of random friction forces on their bottoms imparted by the continuously driven rollers 14. Thus the magnets 28 and 29 serve to prevent the rotation as opposed to the function of the magnet 27 which, by interacting with the aligning arm 25, effects can rotation.

The machine can be operated entirely automatically or semiautomatically, depending on the preference of the user. In the automatic mode, the pusher bar 22 is actuated by a pressure switch associated with the fixed stop 18 and the tilt support 20 is actuated after each two cycles of operation of the pusher bar. No other programming is required because all other parts of the machine remain in continuous operation.

While the invention has been described above having reference to a preferred embodiment thereof it will be understood it can take other forms and arrangements without departing from the scope of the invention. Thus, for example, cans can be moved from the conveyer laterally either singly, in pairs (as shown) or in larger numbers, depending on the size of the carton or the size of the cans. If different sized cans are being accommodated, it will be understood that the permanent magnets 28 and 29 should be adjusted in the direction of conveyor travel to be disposed proximate the portion of the can which is disposed in the vertical plane at the edge of the conveyor, i.e., adjacent the inner edge of the aligning rail 30. Additional cans of course require additional fixed permanent magnets. The magnet 27, performing a different function, however, remains at all times in its fixed position for cooperative action with the aligning arm 25. The invention should not, therefore, be regarded as limited except as defined in the following claims.

I claim:

1. An apparatus for packaging cans having ferromagnetic portions and having laterally projecting bail-supporting ears thereon, a conveyer for moving cans toward a packaging area in series, said conveyer engaging the cans in a frictional coupling affording freedom for rotational movement relative to the conveyer, a can-orienting arm disposed adjacent the conveyer for disposing the cans in predetermined angular positions on the conveyer, said member being disposed in the path of travel of laterally projecting ears proximate the vertical plane tangent to the edges of the series of cans, and magnetic means adjacent said member to impose magnetic forces on successive cans pulling them toward the member to maintain engagement between the member and ears as the cans move forward on the conveyer past the member, whereby the cans are oriented with their ears inside the plane tangent to the can edges without imparting significant displacement of the cans laterally of the direction of conveyer movement.

2. Apparatus as set forth in claim 1, magnetic means comprising a permanent magnet disposed in vertical alignment with said member.

3. Apparatus as set forth in claim 1, said member comprising a fixed arm supported adjacent said conveyer.

4. Apparatus as set forth in claim 1, including a can-loading station, said conveyer affording sliding movement of the cans longitudinally thereof, stop means for arresting travel of the cans lengthwise of the conveyer, and pusher means to force said cans laterally off the conveyer at said station.

5. Apparatus as set forth in claim 4, including additional magnetic means to hold said cans releasably in series alignment on the conveyer after the lead can engages said stop means.

6. Apparatus as set forth in claim 5, including supplemental stop means movable with said pusher means to arrest movement of the cans on the conveyer upstream of said stop means upon actuation of the pusher means.

7. Apparatus as set forth in claim 6, including carton-supporting means adjacent said conveyer to support cartons to receive, edgewise, cans pushed therefrom, said carton-supporting means being normally disposed in the plane of the conveyer at said station, and means to turn the carton-supporting means ninety degrees to dispose the loaded cartons upright with the loading edge at the top thereof.

8. Apparatus as set forth in claim 7, said conveyer including a plurality of independently rotatable rollers, and means to rotate the rollers to drive the cans forwardly thereon.

References Cited in the file of this patent

UNITED STATES PATENTS 1,654,706    Schoen    Jan. 3, 1928
2,941,339    Salwasser    June 21, 1960